(12) United States Patent
Chun et al.

(10) Patent No.: US 9,154,209 B2
(45) Date of Patent: Oct. 6, 2015

(54) METHOD AND APPARATUS FOR TRANSMITTING FEEDBACK IN A WIRELESS COMMUNICATION SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/238,952

(22) PCT Filed: Aug. 10, 2012

(86) PCT No.: PCT/KR2012/006401
§ 371 (c)(1),
(2), (4) Date: Apr. 17, 2014

(87) PCT Pub. No.: WO2013/025020
PCT Pub. Date: Feb. 21, 2013

(65) Prior Publication Data
US 2014/0254705 A1    Sep. 11, 2014

Related U.S. Application Data

(60) Provisional application No. 61/523,811, filed on Aug. 15, 2011, provisional application No. 61/528,275, filed on Aug. 28, 2011.

(51) Int. Cl.
*H04B 7/02* (2006.01)
*H04L 1/02* (2006.01)
*H04B 7/06* (2006.01)

(52) U.S. Cl.
CPC ............. *H04B 7/0626* (2013.01); *H04B 7/024* (2013.01); *H04B 7/063* (2013.01); *H04B 7/0639* (2013.01)

(58) Field of Classification Search
None
See application file for complete search history.

(56) References Cited

U.S. PATENT DOCUMENTS

2010/0323684 A1* 12/2010 Cai et al. ............. 455/422.1
2011/0103493 A1*  5/2011 Xia et al. ............. 375/259

FOREIGN PATENT DOCUMENTS

| KR | 10-2009-0054694 | 6/2009 |
| KR | 10-2010-0136418 | 12/2010 |
| KR | 10-2011-0035807 | 4/2011 |
| KR | 10-2011-0081753 | 7/2011 |

OTHER PUBLICATIONS

Pentech, "CSI Feedback for CoMP in different Scenarios", May 2011, 3GPP TSG RAN1 #65, R1-111648.*
Pantech, "CSI feedback for CoMP in different scenarios," 3GPP TSG RAN1 #65, R1-111648, May 2011, 3 pages.
Korean Intellectual Property Office Application Serial No. 10-2014-7003481, Office Action dated Mar. 20, 2015, 4 pages.

* cited by examiner

*Primary Examiner* — Chieh M Fan
*Assistant Examiner* — Wednel Cadeau
(74) *Attorney, Agent, or Firm* — Lee, Hong, Degerman, Kang & Waimey

(57) ABSTRACT

Disclosed are a method and apparatus for transmitting feedback in a wireless communication system. A terminal transmits first CSI (channel state information) on a first node combination to a base station, or a terminal transmits second CSI on a second node combination to the base station. The total number of antenna ports in the first node combinations is one of two, four, or eight, and the total number of antenna ports in the second node combination is not two, four, and eight.

11 Claims, 13 Drawing Sheets

METHOD AND APPARATUS FOR TRANSMITTING FEEDBACK IN A WIRELESS COMMUNICATION SYSTEM

CROSS-REFERENCE TO RELATED APPLICATIONS

This application is the National Stage filing under 35 U.S.C. 371 of International Application No. PCT/KR2012/006401, filed on Aug. 10, 2012, which claims the benefit of U.S. Provisional Application Ser. No. 61/523,811, filed on Aug. 15, 2011, and 61/528,275, filed on Aug. 28, 2011, the contents of which are all hereby incorporated by reference herein in their entirety.

BACKGROUND OF THE INVENTION

1. Field of the Invention

The present invention relates to wireless communications, and more particularly, to a method and apparatus for transmitting a feedback in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS.

In a distributed multiple node system, a UE needs to feed back channel state information (CSI) for a plurality of nodes. Some of the plurality of nodes may be cooperative nodes and remaining some nodes may be interference nodes. Meanwhile, signaling overhead is too large to feedback, by the UE, the CSI for the plurality of the UE. Accordingly, there is required a method for the UE to efficiently feedback the CSI for the plurality of nodes in the distributed multiple node system.

SUMMARY OF THE INVENTION

The present invention provides a method and apparatus for transmitting a feedback in a wireless communication system. The present invention provides a method for transmitting a feedback for a node combination in which the number of all antenna ports in the node combination is not 2, 4, or 8.

In an aspect, a method for transmitting, by a user equipment, a feedback in a wireless communication system is provided. The method includes transmitting first channel state information (CSI) for a first node combination including at least one node among a plurality of nodes to a base station, and transmitting second CSI for a second node combination including at least one node among the plurality of nodes to the base station. A total number of antenna ports in the first node combination is any one of 2, 4, and 8, and a total number of antenna ports in the second node combination is not 2, 4, and 8.

The first CSI may include a precoding matrix indicator (PMI).

The second CSI may include a concatenation PMI (CPMI) indicating a relative phase difference or a correction value between nodes included in the second node combination.

The first CSI and the second CSI may be jointly transmitted.

The first node combination and the second node combination may be node combinations depending on a CSI configuration received from the base station.

The first node combination and the second node combination may be node combinations depending on the number of antenna ports in the CSI configuration.

The method may further include transmitting indices of layers of nodes included in each of the first node combination and the second node combination to the base station.

The method may further include transmitting the number of all ranks of the nodes included in each of the first node combination and the second node combination to the base station.

The method may further include transmitting information on ranks of the nodes included in each of the first node combination and the second node combination to the base station.

In another aspect, a user equipment (UE) for transmitting a feedback in a wireless communication system is provided. The UE includes a radio frequency (RF) unit for transmitting or receiving a radio signal, and a processor connected to the RF unit, and configured to transmit first channel state information (CSI) for a first node combination including at least one node among a plurality of nodes to a base station, and transmit second CSI for a second node combination including at least one node among the plurality of nodes to the base station. A total number of antenna ports in the first node combination is any one of 2, 4, and 8, and a total number of antenna ports in the second node combination is not 2, 4, and 8.

In the distributed multiple node system, the CSI for the plurality of nodes can be efficient fed back.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3$^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
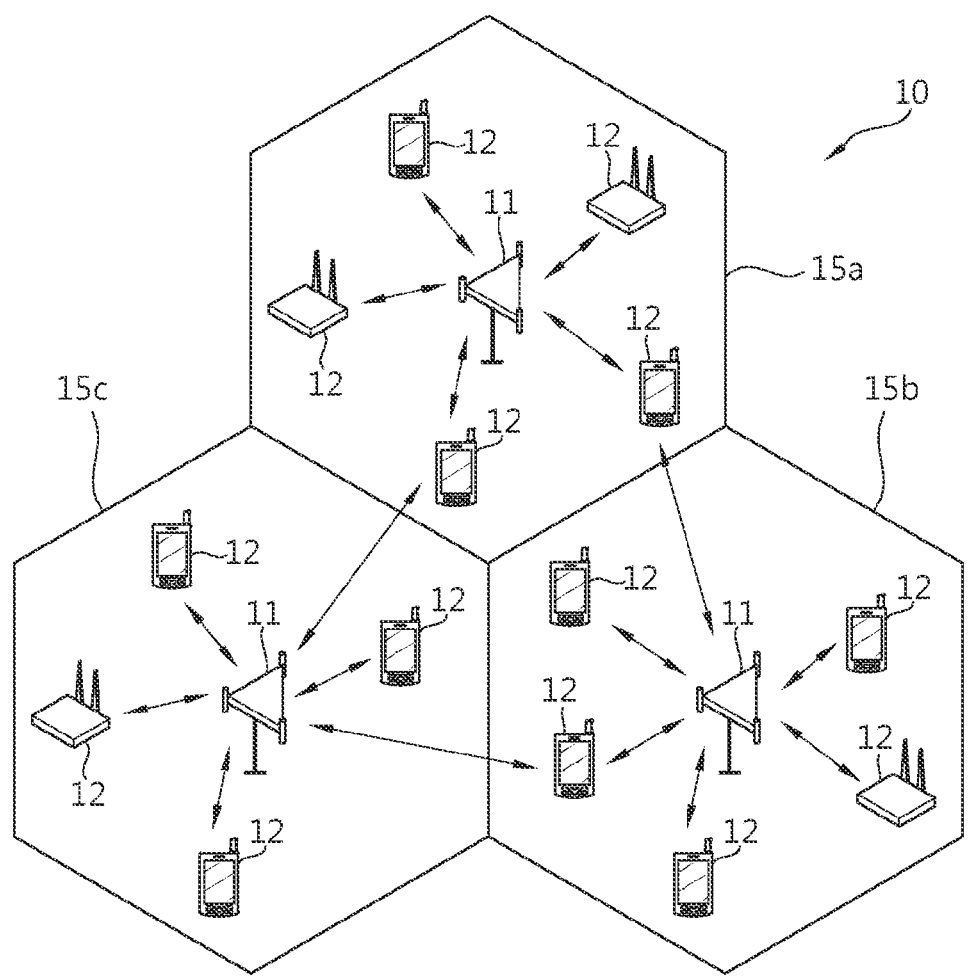
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
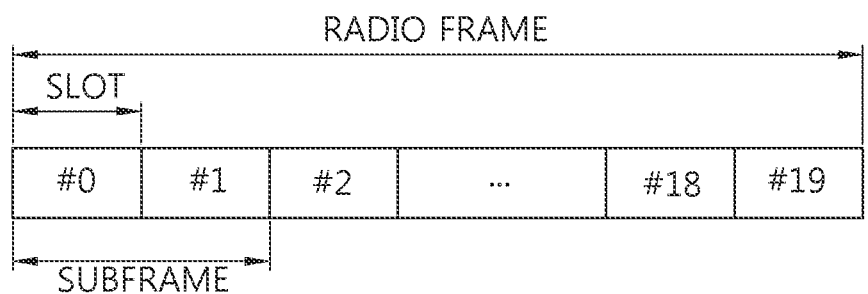
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
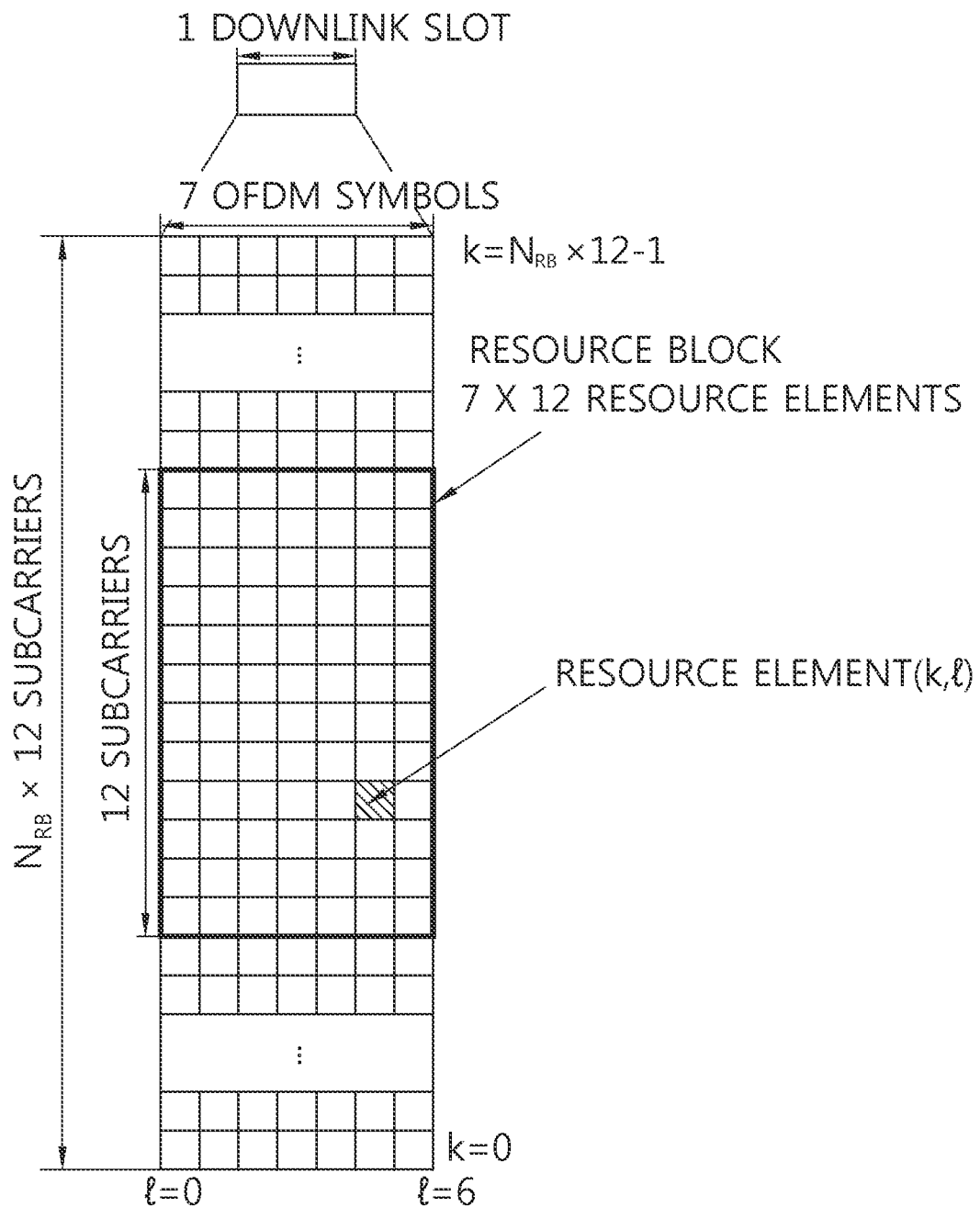
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , $N_{RB}×12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
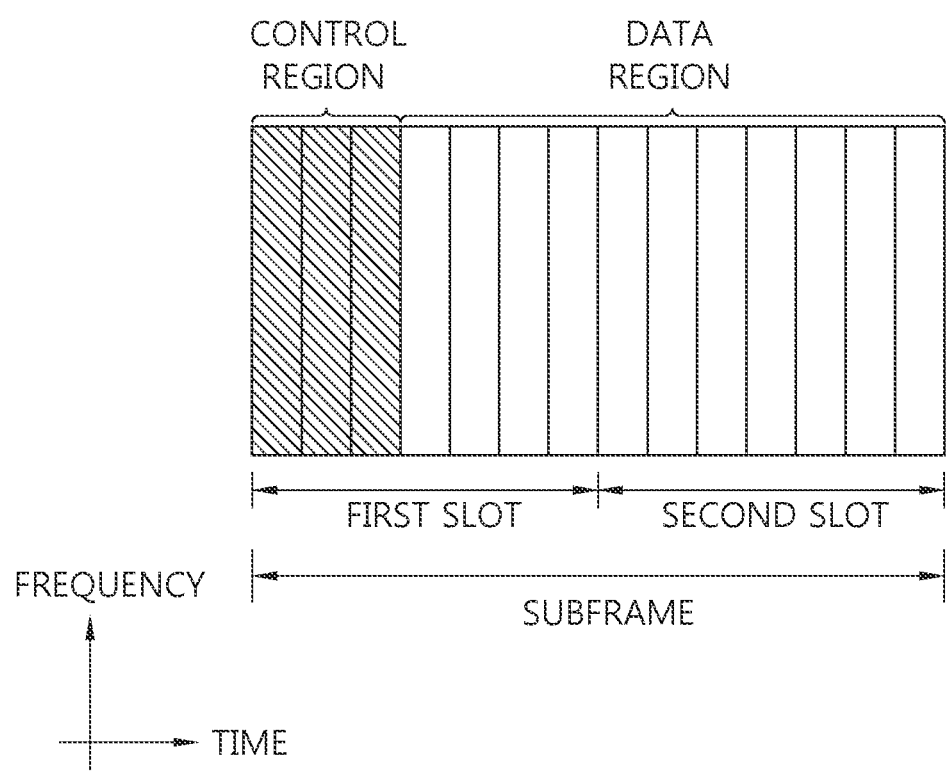
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
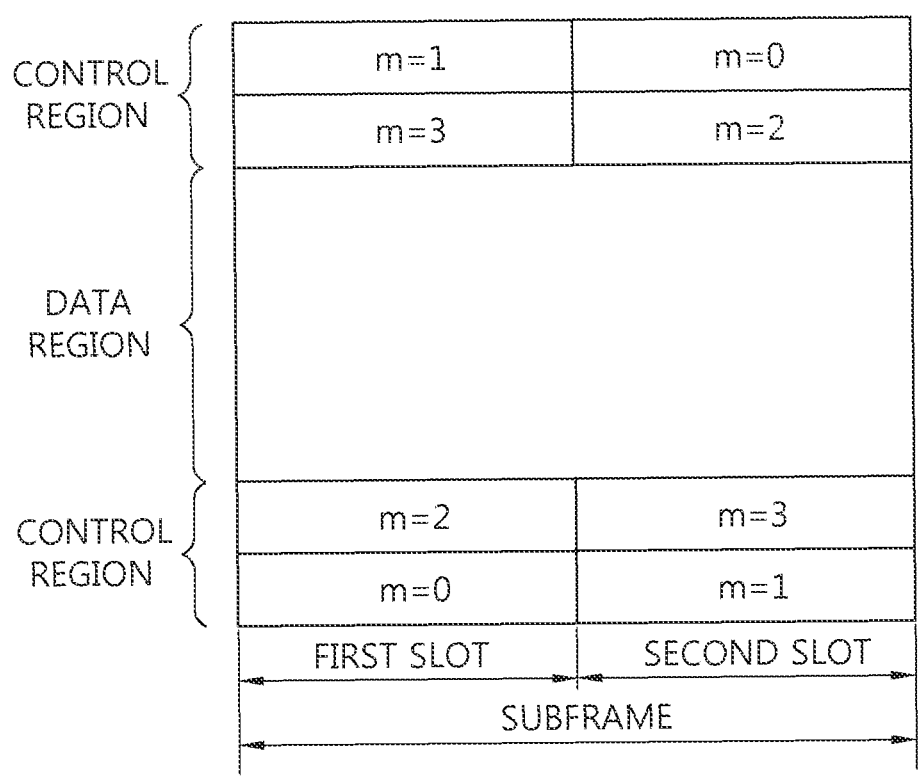
FIG. 5 shows a structure of an uplink subframe.
Figure 5:
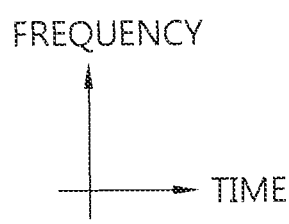

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user.

A wireless communication system having nodes with higher density can provide a higher performance through cooperation between the nodes.

Figure 6:
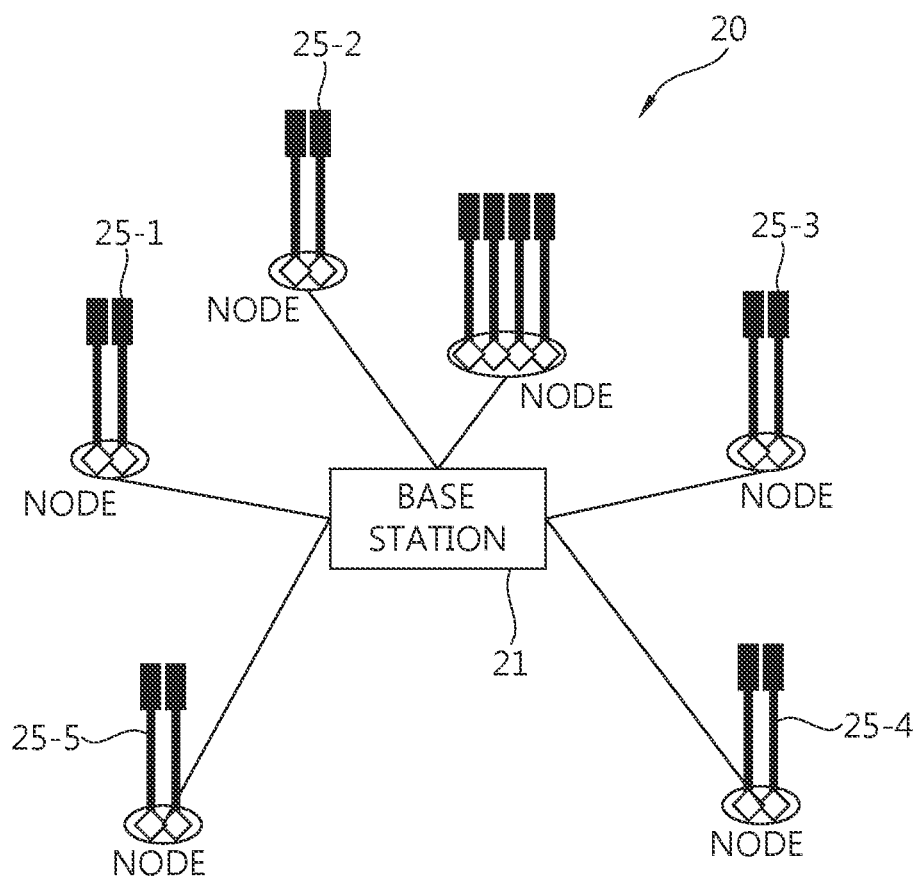
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

A reference signal (RS) is described.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CS-RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of $3^{rd}$ generation partnership project (3GPP) TS 36.211 V10.1.0 (2011-03) "Technical Specification Group Radio Access Network: Evolved Universal Terrestrial Radio Access (E-UTRA): Physical channels and modulation (Release 8)".

Figure 7:
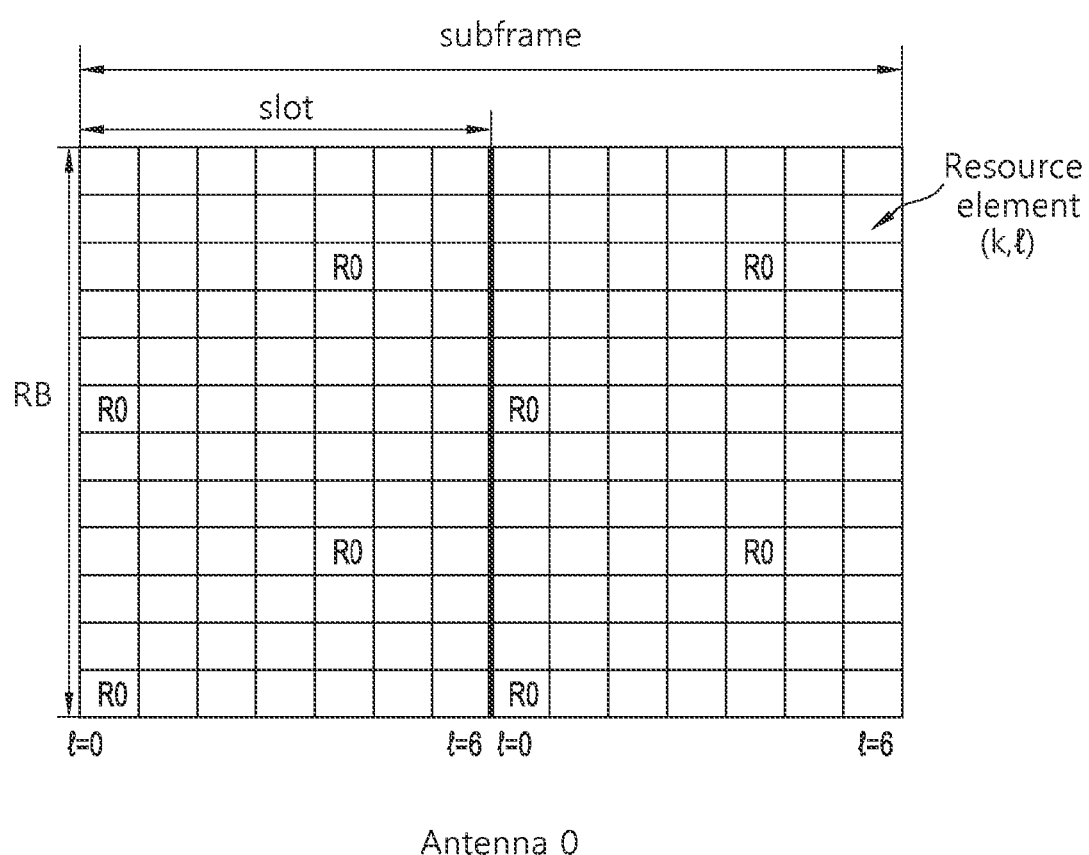
FIGS. 7 to 9 show examples of an RB to which a CRS is mapped.
Figure 8:
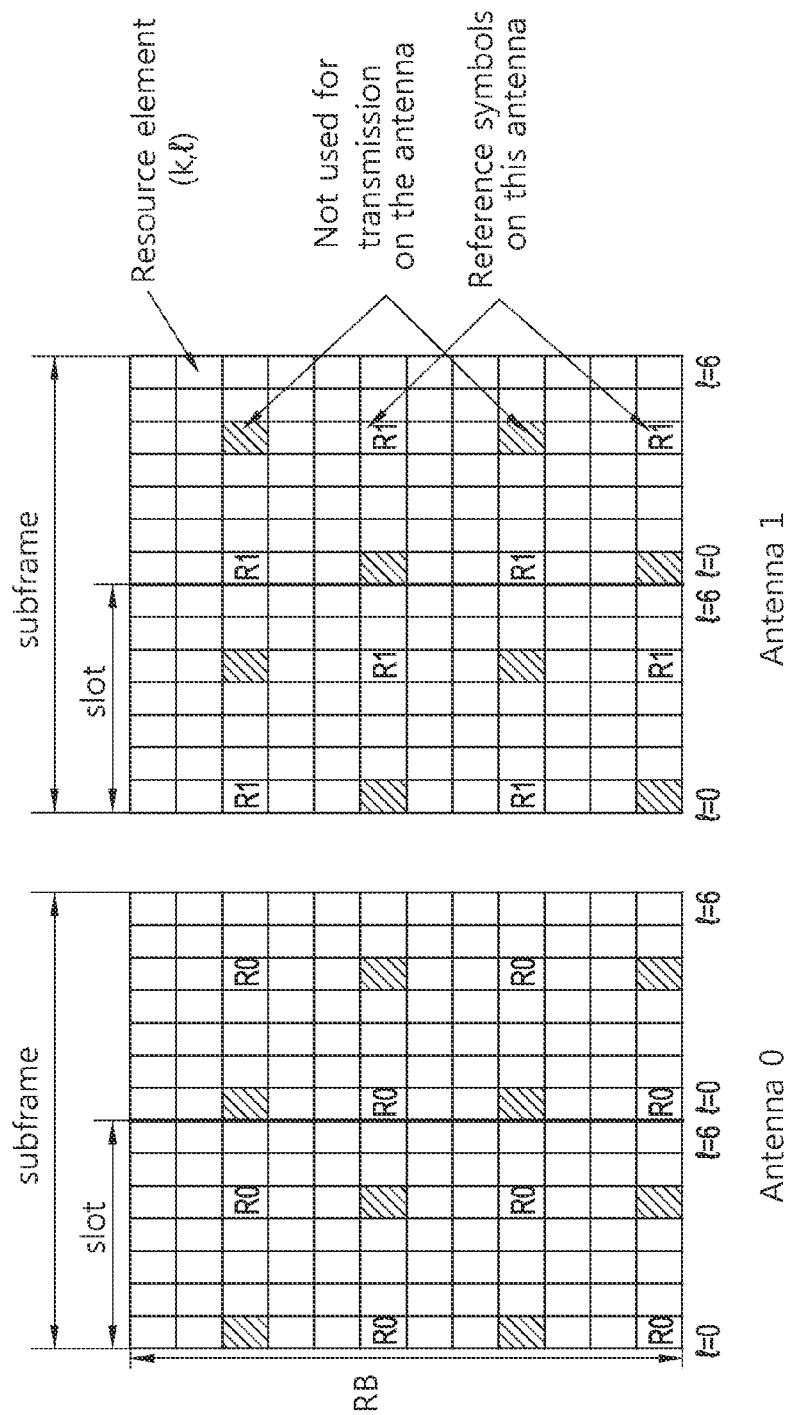
Figure 9:
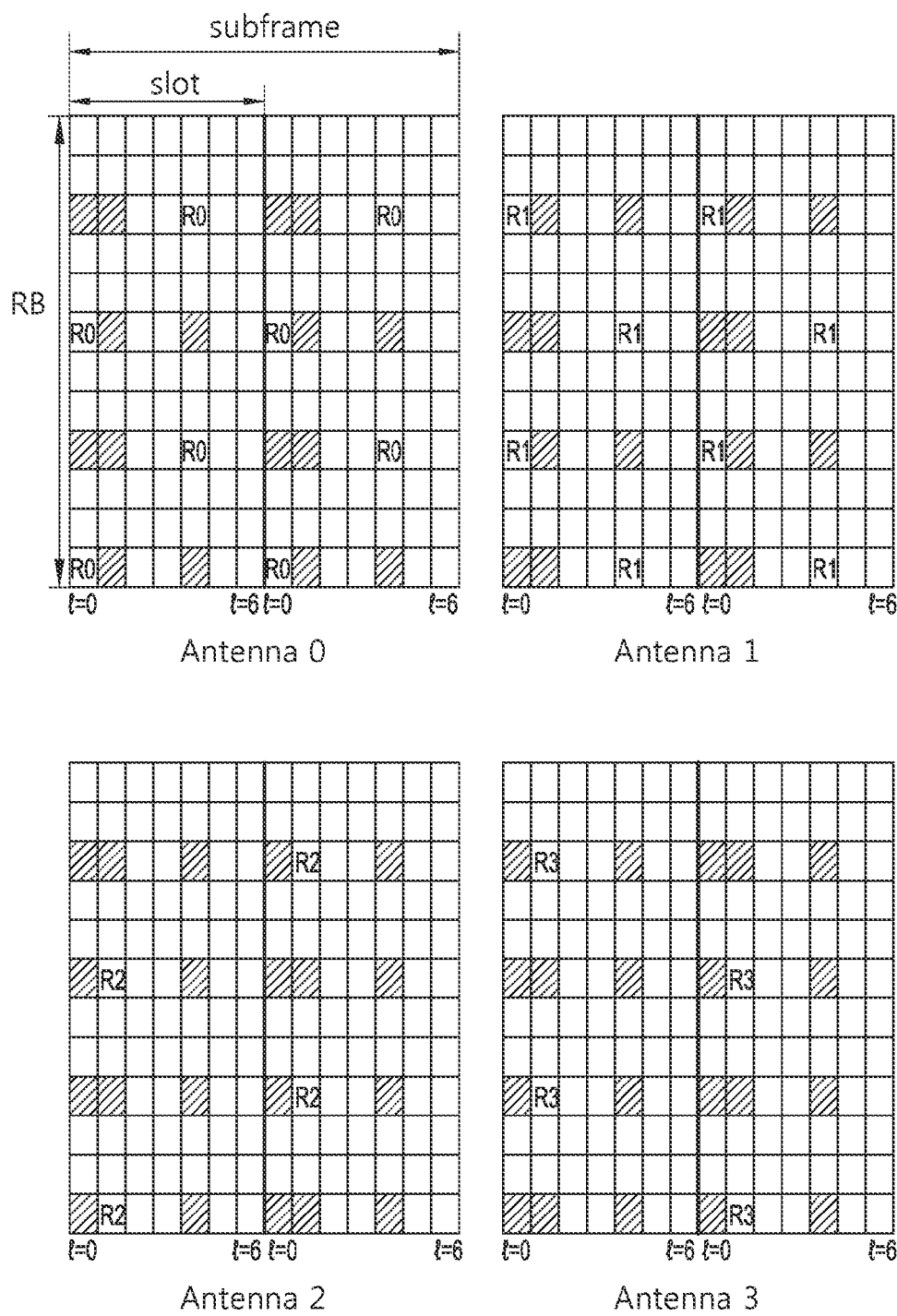

FIGS. 7 to 9 show examples of an RB to which a CRS is mapped.

FIG. 7 shows one example of a pattern in which a CRS is mapped to an RB when a base station uses a single antenna port. FIG. 8 shows one example of a pattern in which a CRS is mapped to an RB when a base station uses two antenna ports. FIG. 9 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 7 to 9, in case the base station carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of user equipments. The CRS sequence multiplied to the CRS is also generated regardless of user equipments. Therefore, all of user equipments within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

The CRS sequence may be applied in unit of OFDM symbol within one subframe. The CRS sequence is varied according to a cell ID, a slot number within one radio frame, OFDM symbol index within the slot, type of CP, etc. Two reference signal subcarriers are involved for each antenna port on one OFDM symbol. In case a subframe includes $N_{RB}$ resource blocks in the frequency domain, the number of reference signal subcarriers for each antenna becomes $2 \times N_{RB}$ on one OFDM symbol. Accordingly, a length of a CRS sequence is $2 \times N_{RB}$.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot (2m + 1)) \quad \langle\text{Equation 1}\rangle$$

where m is 0, 1, . . . , $2N_{RB}^{max}-1$. $2N_{RB}^{max}-1$ is the number of resource blocks corresponding to the maximum bandwidth. For example, in the 3GPP LTE system, $2N_{RB}^{max}-1$ is 110. c(i), a PN sequence, is a pseudo-random sequence, which may be defined by the Gold sequence of length 31. Equation 2 shows an example of the gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{<Equation 2>}$$

where $N_C$ is 1600. $x_1(i)$ is a first m-sequence, and $x_2(i)$ is a second m-sequence. For example, the first m-sequence or the second m-sequence may be initialized for each OFDM symbol according to a cell ID, slot number within one radio frame, OFDM symbol index within the slot, type of CP, etc.

In the case of a system having bandwidth smaller than $2N_{RB}^{max}$, only the specific part of length $2 \times N_{RB}$ from a reference signal sequence of length $2N_{RB}^{max}$ may be used.

Frequency hopping may be applied to the CRS. The period of frequency hopping pattern may be one radio frame (10 ms), and each frequency hopping pattern corresponds to one cell identity group.

At least one downlink subframe may be made of an MBSFN subframes by a higher layer within a radio frame on a carrier supporting PDSCH transmission. Each MBSFN subframe may be divided into a non-MBSFN region and an MBSFN region. The non-MBSFN region may occupy first one or two OFDM symbols within the MBSFN subframe. Transmission in the non-MBSFN region may be carried out based on the same CP as the one used in a first subframe (subframe #0) within a radio frame. The MBSFN region may be defined by OFDM symbols not used for the non-MBSFN region. The MBSFN reference signal is transmitted only when a physical multicast channel (PMCH) is transmitted, which is carried out through an antenna port 4. The MBSFN reference signal may be defined only in an extended CP.

A DMRS supports for PDSCH transmission, and is transmitted on the antenna port p=5, p=, 8 or p=7, 8, . . . , v+6. At this time, v represents the number of layers used for PDSCH transmission. The DMRS is transmitted to one user equipment through any of the antenna ports belonging to a set S, where S={7, 8, 11, 13} or S={9, 10, 12, 14}. The DMRS is defined for demodulation of PDSCH and valid only when transmission of PDSCH is associated with the corresponding antenna port. The DMRS is transmitted only from a RB to which the corresponding PDSCH is mapped. The DMRS, regardless of the antenna port, is not transmitted in a resource element to which either of a physical channel and a physical signal is transmitted. The DMRS may be referred to Section 6.10.3 of the $3^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Figure 10:
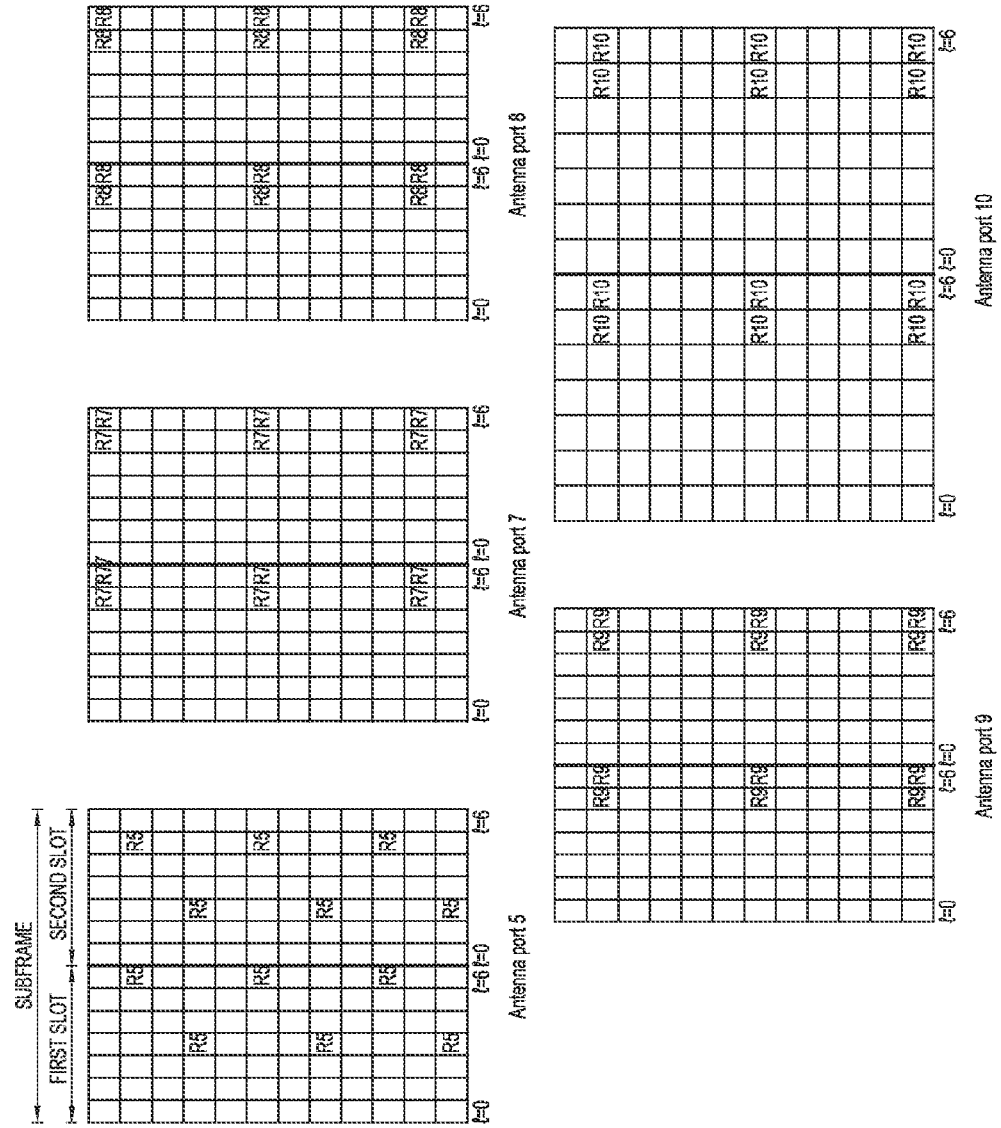
FIG. 10 shows an example of an RB to which a DMRS is mapped.

FIG. 10 shows an example of an RB to which a DMRS is mapped.

FIG. 10 shows resource elements used for the DMRS in a normal CP structure. $R_p$ denotes resource elements used for DMRS transmission on an antenna port p. For example, $R_5$ denotes resource elements used for DMRS transmission on an antenna port 5. Also, referring to FIG. 10, the DMRS for an antenna port 7 and 8 are transmitted through resource elements corresponding to a first, sixth, and eleventh subcarriers (subcarrier index 0, 5, 10) of a sixth and seventh OFDM symbol (OFDM symbol index 5, 6) for each slot. The DMRS for the antenna port 7 and 8 may be identified by an orthogonal sequence of length 2. The DMRS for an antenna port 9 and 10 are transmitted through resource elements corresponding to a second, seventh, and twelfth sub-carriers (subcarrier index 1, 6, 11) of a sixth and seventh OFDM symbol (OFDM symbol index 5, 6) for each slot. The DMRS for the antenna port 9 and 10 may be identified by an orthogonal sequence of length 2. Since S={7, 8, 11, 13} or S={9, 10, 12, 14}, the DMRS for the antenna port 11 and 13 are mapped to resource elements to which the DMRS for the antenna port 7 and 8 are mapped, while the DMRS for the antenna port 12 and 14 are mapped to resource elements to which the DMRS for the antenna port 9 and 10 are mapped.

A CSI RS is transmitted through one, two, four, or eight antenna ports. The antenna ports used for each case is p=15, p=15, 16, p=15, . . . , 18, and p=15, . . . , 22, respectively. The CSI RS may be defined only $\Delta f=15$ kHz. The CSI RS may be referred to Section 6.10.5 of the $3^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Regarding transmission of the CSI-RS, a maximum of 32 configurations different from each other may be taken into account to reduce inter-cell interference (ICI) in a multi-cell environment, including a heterogeneous network (HetNet) environment. The CSI-RS configuration is varied according to the number of antenna ports within a cell and CP, and neighboring cells may have the most different configurations. Also, the CSI-RS configuration may be divided into two types depending on a frame structure. The two types includes a type applied to both of FDD frame and TDD frame and a type applied only to the TDD frame. A plurality of CSI-RS configurations may be used for one cell. For those user equipments assuming non-zero transmission power, 0 or 1 CSI configuration may be used. For those user equipments assuming zero transmission power, 0 or more CSI configurations may be used. The user equipment does not transmit the CSI-RS in a special subframe of the TDD frame, in a subframe in which transmission of the CSI-RS causes collision with a synchronization signal, a physical broadcast channel (PBCH), and system information block type 1, or in a subframe in which a paging message is transmitted. Also, in the set S, where S={15}, S={15, 16}, S={17, 18}, S={19, 20}, or S={21, 22}, resource elements by which the CSI-RS of one antenna port is transmitted are not used for PDSCH or transmission of the CSI-RS of a different antenna port.

Figure 11:
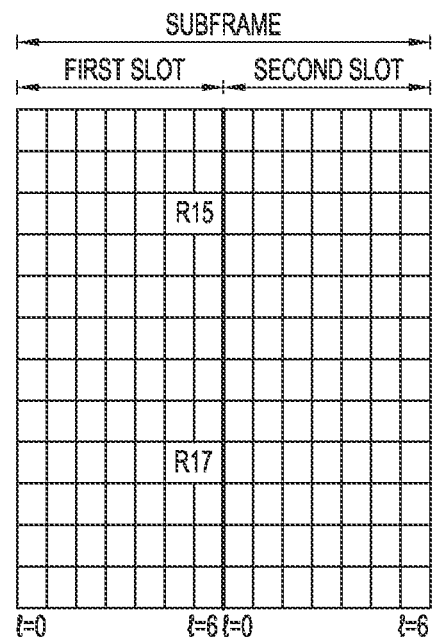
FIG. 11 shows an example of an RB to which a CSI-RS is mapped.
Figure 11:
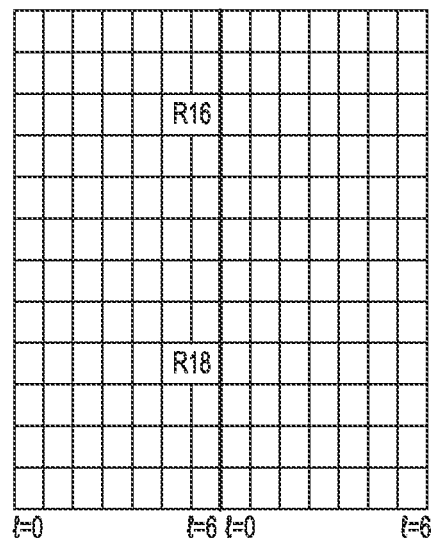
Figure 11:
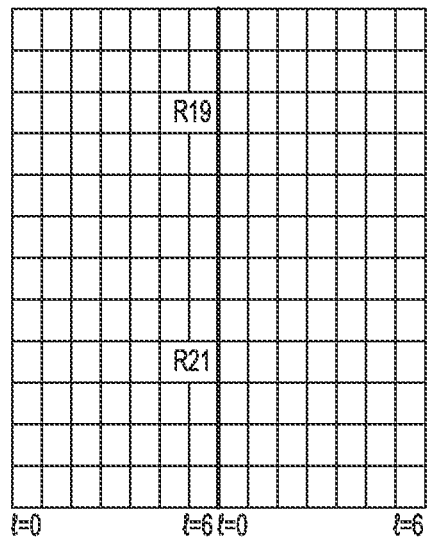
Figure 11:
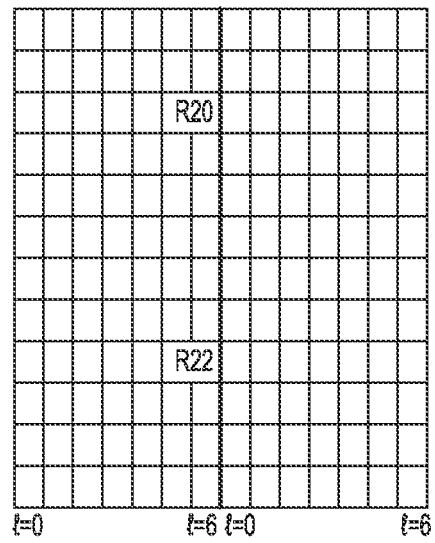

FIG. 11 shows an example of an RB to which a CSI-RS is mapped.

FIG. 11 shows resource elements used for the CSI-RS in a normal CP structure. $R_p$ denotes resource elements used for CSI-RS transmission on an antenna port p. Referring to FIG. 11, the CSI-RS for an antenna port 15 and 16 are transmitted through resource elements corresponding to a third subcarrier (subcarrier index 2) of 1.5 a sixth and seventh OFDM symbol (OFDM symbol index 5, 6) of a first slot. The CSI-RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI-RS for an antenna port 19 and 20 is transmitted through the same resource elements as the CSI-RS for an antenna port 15 and 16 is transmitted. The CSI-RS for an antenna port 21 and 22 is transmitted through the same resource elements as the CSI-RS for an antenna port 17 and 18 is transmitted.

Hereinafter, a proposed method for transmitting a feedback in a distributed multiple node system is described.

It is assumed that the number of nodes that may transmit data to one UE is N. A base station may acquire CSIs for the N nodes from the UE, and may determine a node that will transmit data among N nodes based on the acquired CSI. The UE may feedback the CSI for all or some of the N nodes. That is, the number of combinations of the nodes to which the UE may feedback the CSI is a total of $2^N-1$. The base station configures all or some combinations thereamong as a target for CSI feedback to notify the combinations to the UE. The CSI which the UE feeds back may include a CQI, a PMI, a concatenation PMI (CPMI), an RI, etc. The CPMI may indicate a relative phase difference or a correction value between nodes that belong to the combination.

The CSI may be fed back for all available combinations or only some combinations by an instruction from the base station or determination by the UE. CSIs on various combinations may be jointly fed back through a PUSCH. That is, only one codebook may be transmitted for all of the nodes. To this end, a codebook of which the length is changed is required. Hereinafter, a CSI feedback method in which the CSIs of various combinations are jointly fed back is referred to as a first method. When the CSI is fed back by the first method, the CSIs of various combinations are fed back at once, and as a result, the CSI may be more efficiently transmitted. Alternatively, the CSIs for the respective combinations may be sequentially fed back. That is, the codebooks for the respective combinations are transmitted and a correlation between nodes in the combination, e.g., a difference in a phase or amplitude, may be fed back. Hereinafter, a CSI feedback method in which the CSIs of the respective combinations are sequentially fed back is referred to as a second method. When the CSI is fed back by the second method, accurate CSI for each combination may be fed back. Alternatively, the CSIs for the each node may be fed back, respectively.

A system such as 3GPP LTE/LTE-A or IEEE 802.16 provides the codebook only when the number of antenna ports is 2, 4, and 8. Accordingly, the PMI may not be calculated for a combination of nodes in which the total number of antenna ports is not 2, 4, and 8. For example, it is assumed that nodes which may transmit data to the UE include a total of three nodes of a first node, a second node, and a third node, and the number of antenna ports of the respective nodes are one, one, and two, respectively. In this case, in a combination of the first node and the second node, the total number of antenna ports is two, and as a result, the PMI may be calculated for the corresponding combination. However, in a combination of the first node and the third node or the second node and the third node, the total number of antenna ports is three, and as a result, the PMI cannot be calculated for the corresponding combination. That is, there may be a combination including the number of antenna ports in which the codebook is not supported according to the number of antenna ports of each node and the combination of the nodes. This combination is referred to as a first type combination. Alternatively, there may be a combination including the number of antenna ports in which the codebook is supported. This combination is referred to as a second type combination.

A CSI feedback method for the first type combination is described.

1) The UE may not feedback the CSI for the first type combination. When a UL resource is reserved for the corresponding combination, no signal may also be transmitted. In the case of the first method in which the CSIs for various combinations are jointly fed back, a codeword corresponding to the corresponding combination may be reserved. For example, when the feedback for the corresponding combination is expressed in 5 bits, '00000' may be defined as null. Alternatively, in the case of the second method in which the CSIs for the respective combinations are sequentially fed back, no signal may also be transmitted in a feedback region for the corresponding combination.

2) The UE may not feedback the CSI for the first type combination. Since both the UE and the base station may know that the corresponding combination is the first type combination, the UE may skip the CSI feedback for the corresponding combination when feeding back the CSI. In the case of the first method, the CSI feedback for the corresponding combination is skipped and thereafter, CSI for a subsequent effective combination may be fed back. In the case of the second method, the CSI for the subsequent second type combination may be fed back in the feedback region for the first type combination.

3) The UE may feedback the CPMI for the first type combination and may feedback the PMI for the second type combination. For example, it is assumed that the number of antenna ports of the first, second, and third nodes are 1, 1, and 2, respectively and combinations of the nodes which are the targets of the CSI feedback are {a first combination=node 1}, {a second combination=node 2}, {a third combination=node 3}, {a fourth combination=node 1 and node 2}, {a fifth combination=node 1 and node 3}, {a sixth combination=node 2 and node 3}, and {a seventh combination=node 1, node 2, and node 3}. In this case, the PMI is transmitted for the fourth combination and the seventh combination in which the total number of antenna ports is 2 or 4 to calculate the PMI and the CPMI is transmitted for the fifth combination and the sixth combination in which the codebook is not supported not to calculate the PMI. As another example, it is assumed that the numbers of antenna ports of the first node and the second node are 2 and 4, respectively and the combinations of the nodes which are the target of the CSI feedback are {a first combination=node 1}, {a second combination=node 2}, and {a third combination=node 1 and node 2}. In this case, the PMI is transmitted for the first combination and the second combination, and the CPMI is transmitted for the third combination.

Figure 12:
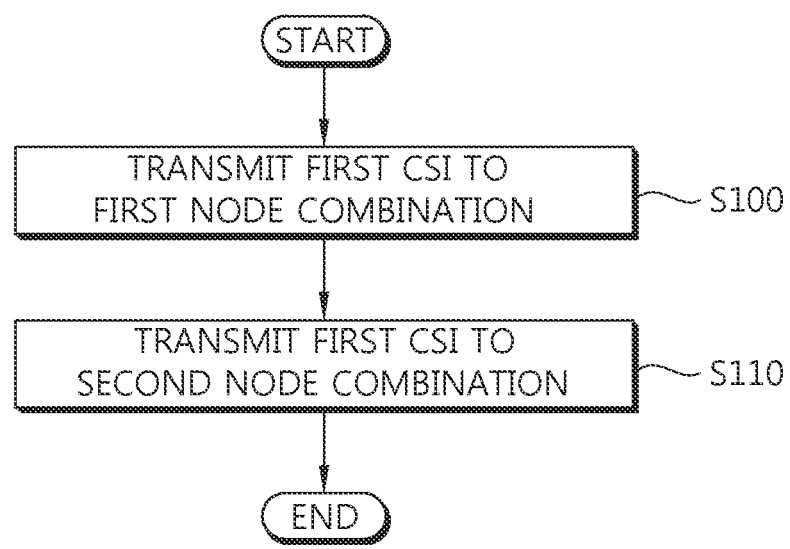
FIG. 12 shows an embodiment of a proposed method for transmitting a feedback.

FIG. 12 shows an embodiment of a proposed method for transmitting a feedback.

In step S100, the UE transmits a first CSI for a first node combination including at least one node among a plurality of nodes, and in step S110, the UE transmits to the base station a second CSI for a second node combination including at least one node among the plurality of nodes. In this case, the total number of the antenna ports in the first node combination may be any one of 2, 4, and 8 and the total number of the antenna ports in the second node combination may not be 2, 4, and 8. The PMI may be transmitted for the first node combination and the CPMI may be transmitted for the second node combination.

Meanwhile, the nodes described in the above embodiment may be physical antennas and may be indicated by an RS corresponding to each physical antenna. Alternatively, the nodes may be a group of co-located antennas or a virtual antenna group expressed through the CSI-RS. For example, when the UE receives CSI-RSs of a plurality of non-zero transmission powers, the UE may feedback the CSI according to a combination of CSI-RS configurations. The UE may measure the CSI by using CSI-RS configurations 0 and 1 and may feedback the CSI for {a first combination=CSI configuration 0}, {a second combination=CSI configuration 1}, {a third combination=CSI configuration 0 and CSI configuration 1} according to the aforementioned method. When the CSI is fed back according to above method, an existing information element (IE) may be used. Alternatively, when the UE receives a CSI-RS configuration of one non-zero transmission power and is instruct to configure clusters by dividing antenna ports in the corresponding CSI-RS configuration, the UE may feedback the CSI according to a combination of the clusters. For example, when it is assumed that the CSI-RS configuration 0 of 4Tx is received, and antenna ports 15 and 16 are configured as a first cluster and antenna ports 17 and 18 are configured as a second cluster, the CSI may be fed back for {a first combination=the first cluster}, {a second combination=the second cluster}, and {a third combination=the first cluster and the second cluster} according to the aforementioned method. When the CSI is fed back according to the above method, a new IE may be defined. Meanwhile, in the above description, the node may be substituted with an antenna or a layer.

Meanwhile, when the CSI for each node is respectively fed back, an index of the layer or stream of each node may be additionally fed back in order to feedback a correlation of the respective nodes. In the 3GPP LTE/LTE-A, the index of the layer may be fed back, and in the IEEE 802.16m, the index of the stream may be fed back. Hereinafter, it is assumed that the index of the layer of each node is fed back.

When the index of the layer of each node is not fed back, the base station may not know configurations of all layers. For example, it is assumed that there are the first node, the second node, and the third node, and the number of ranks of the first node 1, the number of ranks of the second node is 1, and the number of ranks of the third node is 2. That is, the number of all ranks may be is 2. In this case, it may be not known whether two all ranks are constituted by {a first layer=first layers of the first node and the third node} and {a second layer=second layers of the second node and the third node} or {a first layer=first layers of the first node, the second node, and the third node} and {a second layer=the second layer of the third node}. As a result, in order to determine the configuration between the respective nodes, the index of the layer of each node needs to be additionally fed back. In this case, rank information and/or all rank information of each node may be fed back together.

For example, it is assumed that the number of all ranks is 4, the number of ranks of the first node is 1, the number of ranks of the second node is 1, and the number of ranks of the third node is 2. When it is fed back that the first node is layer index 1, the second node is index 2, and the third node is layer indexes 3 and 4, the base station may acknowledge configurations of all layers of cooperative nodes. Alternatively, when the number of all ranks is designated the maximum number of ranks among the cooperative nodes, the number of all ranks need not be fed back and only a layer index of nodes not having the maximum number of ranks is fed back. That is, the number of ranks of the third node is 2, and as a result, the number of all ranks may be 2. In this case, it may be fed back that {a first layer=the first layers of the first node and the third node} and {a second layer=the second layers of the second node and the third node}. In this case, since the number of ranks of the third node is the same as the number of all layers, if the order of two layers may be known, the layer index needs not to be fed back for the third node.

Figure 13:
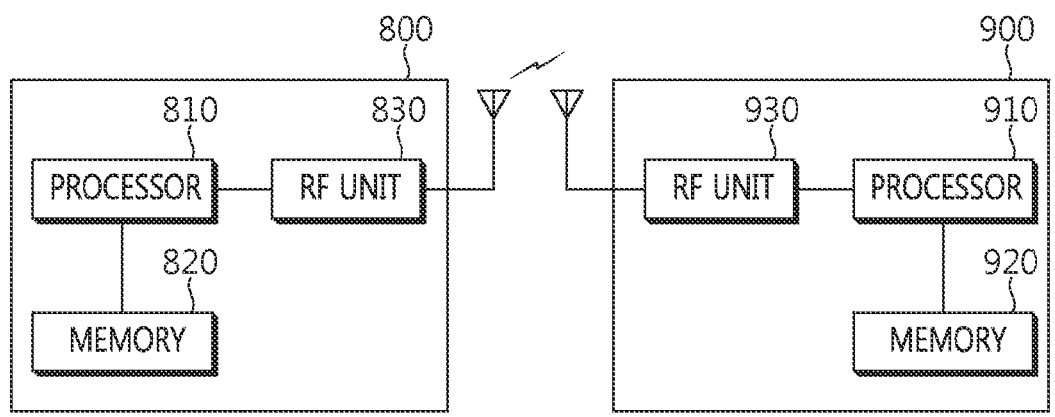
FIG. 13 is a block diagram showing wireless communication system to implement an embodiment of the present invention.

FIG. 13 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment, a feedback in a wireless communication system, the method comprising:
   transmitting first channel state information (CSI) for a first node combination including at least one node among a plurality of nodes to a base station; and
   transmitting second CSI for a second node combination including at least one node among the plurality of nodes to the base station,
   wherein the first CSI includes a precoding matrix indicator (PMI),
   wherein the second CSI includes a concatenation PMI (CPMI) indicating a relative phase difference or a correction value between nodes included in the second node combination,
   wherein a total number of antenna ports in the first node combination is any one of 2, 4, or 8, and
   wherein a total number of antenna ports in the second node combination is not 2, 4, or 8.

2. The method of claim 1, wherein the first CSI and the second CSI are jointly transmitted.

3. The method of claim 1, wherein the first CSI and the second CSI include a channel quality indicator (CQI).

4. The method of claim 1, wherein the first CSI and the second CSI include a rank indicator (RI).

5. The method of claim 1, further comprising:
   receiving information on the first node combination and the second node combination from the base station.

6. The method of claim 1, wherein the first node combination and the second node combination are node combinations depending on a CSI configuration received from the base station.

7. The method of claim 1, further comprising:
   transmitting indices of layers of nodes included in each of the first node combination and the second node combination to the base station.

8. The method of claim 6, wherein the first node combination and the second node combination are node combinations depending on the number of antenna ports in the CSI configuration.

9. The method of claim 7, further comprising:
   transmitting the number of all ranks of the nodes included in each of the first node combination and the second node combination to the base station.

10. The method of claim 7, further comprising:
    transmitting information on ranks of the nodes included in each of the first node combination and the second node combination to the base station.

11. A user equipment (UE) for transmitting a feedback in a wireless communication system, the UE comprising:
    a radio frequency (RF) unit for transmitting or receiving a radio signal; and
    a processor connected to the RF unit, and configured to:
    transmit first channel state information (CSI) for a first node combination including at least one node among a plurality of nodes to a base station; and
    transmit second CSI for a second node combination including at least one node among the plurality of nodes to the base station,
    wherein the first CSI includes a precoding matrix indicator (PMI),
    wherein the second CSI includes a concatenation PMI (CPMI) indicating a relative phase difference or a correction value between nodes included in the second node combination,
    wherein a total number of antenna ports in the first node combination is any one of 2, 4, or 8, and
    wherein a total number of antenna ports in the second node combination is not 2, 4, or 8.

* * * * *